Figure 1:
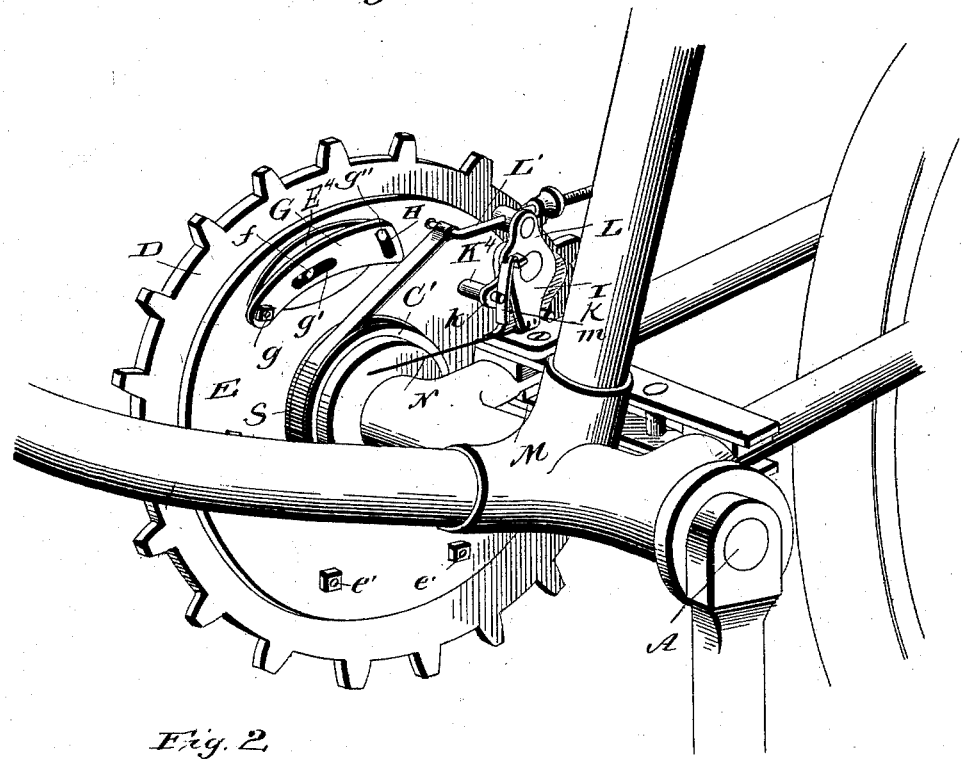

(No Model.) 2 Sheets—Sheet 1.

G. W. KORTRIGHT.
COMBINATION SPROCKET WHEEL.

No. 524,443. Patented Aug. 14, 1894.

Witnesses
L. C. Hills
A. L. Hough

Inventor
George W. Kortright
by
Franklin W. Hough
Attorney (No Model.) 2 Sheets—Sheet 2.
G. W. KORTRIGHT.
COMBINATION SPROCKET WHEEL.
No. 524,443. Patented Aug. 14, 1894.
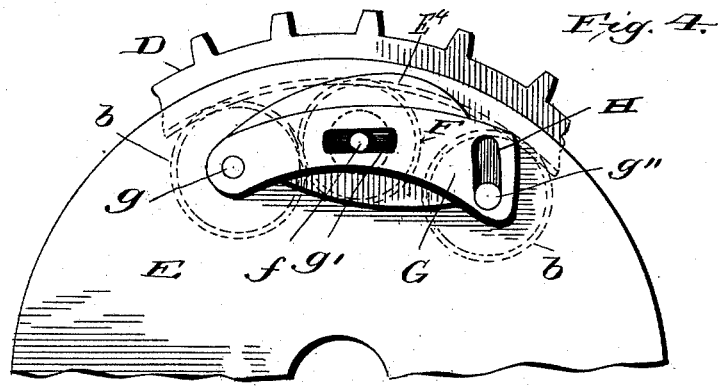
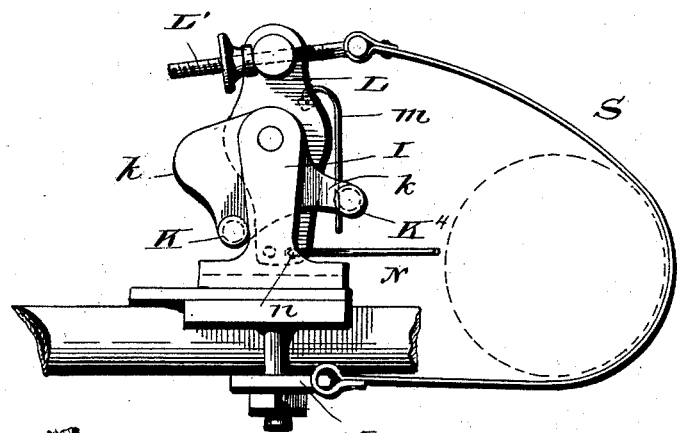
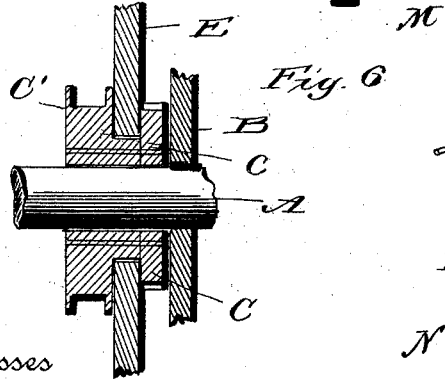
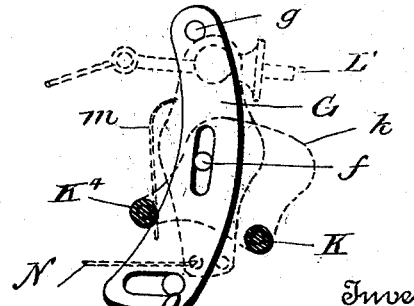
Witnesses
L. C. Hills
A. L. Hough
Inventor
George W. Kortright
by
Franklin H. Hough
Attorney
THE NORRIS PETERS CO., PHOTO-LITHO., WASHINGTON, D. C.

UNITED STATES PATENT OFFICE.

GEORGE W. KORTRIGHT, OF SIOUX CITY, IOWA.

COMBINATION SPROCKET-WHEEL.

SPECIFICATION forming part of Letters Patent No. 524,443, dated August 14, 1894.

Application filed September 23, 1893. Serial No. 486,312. (No model.)

*To all whom it may concern:*

Be it known that I, GEORGE W. KORTRIGHT, a citizen of the United States, residing at Sioux City, in the county of Woodbury and State of Iowa, have invented certain new and useful Improvements in Combination Sprocket-Wheels; and I do declare the following to be a full, clear, and exact description of the invention, such as will enable others skilled in the art to which it appertains to make and use the same, reference being had to the accompanying drawings, and to the letters of reference marked thereon, which form a part of this specification.

This invention relates to certain new and useful improvements in clutches and combination sprocket-wheels designed for use on bicycles, and it aims to produce an invention by which there shall be a great saving in the wear of certain parts when the same are not needed for the propulsion of the bicycle; as while coasting down a grade when the high gear is used, and I provide mechanism whereby the pedals and the driving-shaft of a bicycle may be held from turning with the sprocket-wheel and endless-chain, while the latter are making rapid revolutions. By holding the shaft from revolution with the sprocket-wheel and chain, the pedals may be used as foot-rests for the rider, while coasting down a grade.

My invention further consists in a combination sprocket-wheel that can be applied to any chain bicycle by removing the solid sprocket and applying the combination sprocket and clutch.

My invention consists in having in combination with the gearing mechanism of a sprocket-wheel a clutch, whereby the main driving shaft and pedals of a bicycle, may, by means of a rod running to the handle bars, be thrown into or out of an operative condition, thereby securing high or low speed gear, at the will of the rider.

The invention consists further in the novel construction, combination and adaptation of parts, which will be hereinafter more fully described in detail, and illustrated in the drawings.

Figure 2:
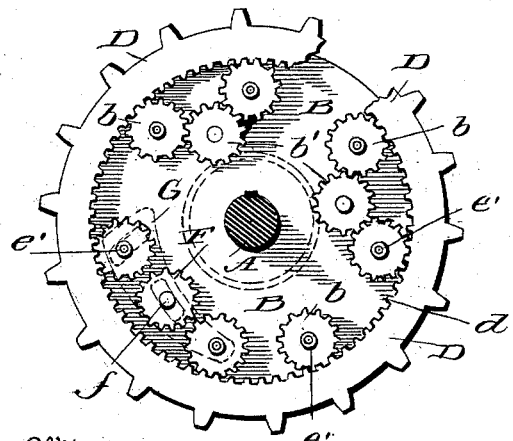
Figure 3:
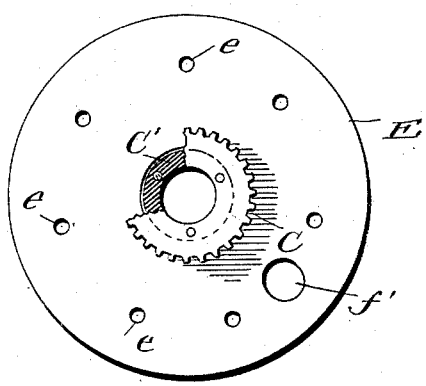

In the drawings, which, with the letters of reference marked thereon form a part of this specification, Figure 1 is a perspective view of my combination sprocket-wheel and clutch, as applied to a bicycle. Fig. 2, is a detail view of the sprocket-wheel and its gearing. Fig. 3, is a detail of a side-plate to the sprocket-wheel. Fig. 4, is a detail view of the lever for changing the gearing. Fig. 5, is a side view of the clutch-operating mechanism to actuate the gear-lever. Fig. 6, is a vertical section through the axle at the gear. Fig. 7, is a detail in side elevation showing one of the lugs in engagement with the plate G.

Reference now being had to the details of the drawings by letter, A represents the driving-shaft of a bicycle, to which is keyed the plate or drum B of the sprocket-wheel.

$b$, $b$ are cogged wheels which turn on fixed pivots which are secured to the plate B at convenient distances apart, and from the rim of the plate B.

$b'$, are intermediate cogged wheels which mesh with any one or two of the wheels $b$, and are provided to communicate motion from the gear-wheel C with which it meshes, to the wheels $b$; thence to the independent sprocket-wheel D provided with cogs $d$ on its outer periphery.

It will be observed that the geared wheel C is loosely journaled on the driving-shaft A, and that said geared wheel C is provided with a collar which passes through an aperture in the plate E, and is riveted to a friction-wheel $C'$ also having a collar; thus forming a bearing on which the plate E is loosely journaled.

$e$, $e$ are perforations through which the threaded ends of the bearings $e'$ pass when the plate incases the gearing of the sprocket-wheel, nuts being screwed on the said threaded bearings to hold the plate in a locked position.

F is a cogged or clutch wheel which moves freely on the inner face of the plate and is provided with the lug $f$ which passes up through the aperture $f'$ in the plate E, when said plate is in place, bolted to the drum B. Through the means of this wheel or clutch, by moving the same into mesh with one of the wheels b, and the cogs on the inner periphery of the sprocket wheel D, the entire sprocket wheel moves with the shaft. On the outer face $E^4$ of the plate E, is pivoted the lever G having one end fastened at g, allowing said lever to have one end free and having a slot g' at a point substantially in its center and directly over the aperture f', and the said lever G is adapted to throw the cogged wheel or clutch F into or out of mesh with the internal gearing of the sprocket wheel by a lateral movement of said lever guided by the lug g'' in the slot H, near the free end of the lever.

Attached to the arms of the bicycle, running from the main shaft to the axle of the rear wheel of the bicycle and in the rear of the frame supporting the saddle, I securely attach the clutch-support I, in such a position as to bring the lugs K, $K^4$ which are secured at suitable distances apart, on the plate k, against the side of the plate E, the said plate k being pivoted to a vertical member of the support I. The lugs K, $K^4$, are intended to straddle the lever G. The plate k has a limited motion on its pivot which will allow the lugs to move the lever G to regulate the gearing of the sprocket-wheel.

L is a lever pivoted near its center to the end of the vertical member of the support I, and having the same pivoted axis, as the plate k. The said lever L has a lug swiveled in one of its projections and in said swiveled lug is carried the rod L' bent at one end so as to engage the strap or friction spring S, which spring passes around the friction-wheel C' and its other end is secured to a projection on the end of the rod M beneath one of the arms which run to the axle of the rear wheel. The lever L has the same swinging movement as the plate k, and is limited by the same lugs K, $K^4$ which project through the plate k, together with a supplemental movement against the tension of the spring m, this spring acting as a tension when the plate or lever k is drawn forward as far as it can come, to move the lever G on the side of the sprocket-plate. The lever L can come still farther and make a greater tension on the spring S. The lug $K^4$ engages the side of the lever nearest the center of the wheel, and the lug K engages the side of the lever opposite the center of the wheel. The rod N for operating the clutch is fastened at one end to the end of the lever L, as at n, and the other end to a brake-lever within easy reach of the rider, at the handle bars.

The operation of my invention will be readily understood. When the cord N is drawn forward the lug K will be thrown up against the outer side of the lever G and when the tension of the friction spring is great enough to hold the wheel C', the clutch being disengaged from the cogs of the wheel D, the sprocket-wheel D receives its motion from the cogged wheels b, which are pivoted to the plate E, which is keyed to and turns with the shaft A. The cogged wheels b' meshing with the geared wheels b and with the gearing on the wheel C, the said wheel being held from turning by the spring S, the cogged wheels b' turn around on its periphery, thus causing the sprocket wheel D to make slower revolutions than the crank-shaft and thus creating a lower geared wheel, and when not required for power the gearing is locked together and the sprocket wheel and shaft revolve together as an ordinary solid wheel. The resiliency of the spring band S throws the plate I in the opposite direction to that in which it is drawn by the cord N.

For coasting, the clutch is disengaged, the geared wheel C and the sprocket wheel are allowed to turn loosely and the pedals will not revolve but are free to be used as rests for the feet of the rider.

Having thus described my invention, what I claim to be new, and desire to secure by Letters Patent, is—

1. In a sprocket wheel for bicycles, the combination of a main driving shaft, plate or drum keyed thereto, the central pinion C, said plate carrying fixed pivots on its inner face on which are journaled cogged wheels meshing with a gear on the inner periphery of an independent sprocket wheel moving with said shaft, the sliding cogged wheel or clutch F, on the inner face of said plate, mounted to slide to engage both the pinion on the plate and the gear rim for locking said sprocket wheel to turn with the main shaft, substantially as shown and described.

2. A combination sprocket wheel having an independent rim on its shaft with its inner periphery geared to mesh with a series of cogged wheels carried on a plate keyed to the main driving shaft, a second incasing plate carrying a loosely journaled collared wheel having a geared periphery cogged wheel b', sliding gear wheel or clutch F on the inner face of said plate mounted to slide to engage both the pinion on the plate and the gear rim and a lever secured to the outer face of the plate E for determining the gearing of the sprocket wheel, and devices for moving said lever, substantially as shown and described.

3. A gear shifting lever in combination with a geared sprocket wheel, substantially as described, consisting of a lever carried on the side plate of the geared sprocket wheel, the plate k pivotally connected on a vertical member of the support I, and having the lugs K $K^4$, for engagement with the lever, to shift the gearing of the sprocket wheel, substantially as shown and described.

4. A geared shifting lever in combination with a geared sprocket wheel substantially as described, consisting of a lever carried on the side plate of the geared sprocket wheel, the plate $k$, lugs K, K⁴ and having a common axis with a second plate or lever L, provided with a spring $m$ bearing against one of the said lugs when the spring is in tension, the swiveled lug in one of the projections of the lever L, and carrying a rod L' which engages one end of the spring S, passing around the friction wheel C', and secured to the opposite end of the lever L, the cord connected to the lever, substantially as shown and described.

In testimony whereof I affix my signature in presence of two witnesses.

GEO. W. KORTRIGHT.

Witnesses:
  J. D. WOOD,
  FRED H. PATCH.